United States Patent [19]

Scharnhorst

[11] 3,740,690

[45] June 19, 1973

[54] ELECTRO-OPTICAL DETECTOR

[75] Inventor: Peter Scharnhorst, Beltsville, Md.

[73] Assignee: The United States of America as represented by the Secretary of the Navy, Washington, D.C.

[22] Filed: Mar. 14, 1972

[21] Appl. No.: 234,627

[52] U.S. Cl. .............................. 338/18, 250/83.3 H

[51] Int. Cl. .............................................. H01c 7/08

[58] Field of Search ........................ 338/18, 15, 20; 250/83.3 H, 83 R; 75/134, 166; 252/501, 62.3; 317/234; 136/238, 239; 106/47; 96/88; 29/572, 576

[56] References Cited

UNITED STATES PATENTS 3,224,876 12/1965 Fredrick .............................. 75/166
3,364,014 1/1968 Fredrick .............................. 75/134

*Primary Examiner*—C. L. Albritton
*Attorney*—R. S. Sciascia, J. A. Cooke and M. G. Berger

[57] ABSTRACT

An infrared detector comprising an amorphous film of $[A_{1-y}(Pb_{1-x}Sn_x)_y]_z B_{1-z}$ wherein A is Ge or Si, $B$ is Te or Se, X varies from 0 to 1, $y$ varies from 0 to 1 and $z$ varies from 0 to 1 which is contacting glass.

17 Claims, 2 Drawing Figures

ELECTRO-OPTICAL DETECTOR

BACKGROUND OF THE INVENTION

This invention generally relates to electrooptical detectors and more particularly to electrooptical detectors which are capable of detecting radiation in the far infrared (8–14 micron) region of the electromagnetic spectrum.

A number of different materials can be used to make radiation detectors which operate in different parts of the far infrared portion of the electromagnetic spectrum. Most of these detectors utilize the photosensitive substance in either single crystal bulk form or in the form of polycrystalline or single crystal thin films. Suitable single crystal bulk material is difficult to synthesize and is difficult to dimension properly to optimize device performance. Films, on the other hand, have to be produced either by means of delicate chemical deposition procedures, by means of a polycrystalline growth from the vapor phase or by means of epitaxial growth from the vapor phase, in which case it is difficult to control stoichiometry.

Furthermore, it is often necessary to complete the device fabrication with a sensitization procedure. Invariably the resulting device has to be cooled below room temperature to optimize its performance.

Hence research has continually been conducted to find materials which could be used as detectors in the far infrared region of the electromagnetic spectrum which are easier to prepare than the materials presently in use for the same purpose.

SUMMARY OF THE INVENTION

Accordingly, one object of this invention is to provide a material which can be used as a detector in the far infrared region of the electromagnetic spectrum.

Another object of this invention is to provide an infrared detector which is relatively easy to synthesize.

Another object of this invention is to provide an infrared detector which is relatively easy to dimension properly.

Yet another object of this invention is to provide an infrared detector which can be produced without requiring extensive control of the stoiceiometry of the material being deposited.

A still further object of this invention is to provide an infrared detector which does not have to be cooled below room temperature after fabrication in order to increase sensitivity to an acceptable level.

These and other objects of this invention as accomplished by providing an infrared detector comprising a silicon oxide (silicon-oxygen) based glass substrate, a pair of adjacent but non-contacting electrical conducting electrodes contacting one surface of said glass and an amorphous film contacting each of said pair of electrical conducting electrodes and the glass bridging said pair of electrical conducting electrodes wherein said film comprises a material of the formula $[A_{1-y}(Pb_{1-x}Sn_x)_y]_z B_{1-z}$ wherein $A$ is selected from the group consisting of Ge and Si, $B$ is selected from the group consisting of Te and Se, $x$, $y$ and $z$ refer to atomic fraction wherein $x$ varies from 0 to 1, $y$ varies from 0 to 1 and $z$ varies from 0 to 1. Thus, $x$, $y$ and $z$ can be any value between 0 and 1 including 0 and 1 providing that the resultant film is amorphous (as opposed to crystalline or polycrystalline) at the operating temperature of the device.

BRIEF DESCRIPTION OF THE DRAWING

Other objects and many of the attendant advantages of the present invention will be readily appreciated as the same becomes better understood by reference to the following detailed description when considered in connection with the accompanying drawings.

DESCRIPTION OF THE PREFERRED EMBODIMENTS

Figure 1:
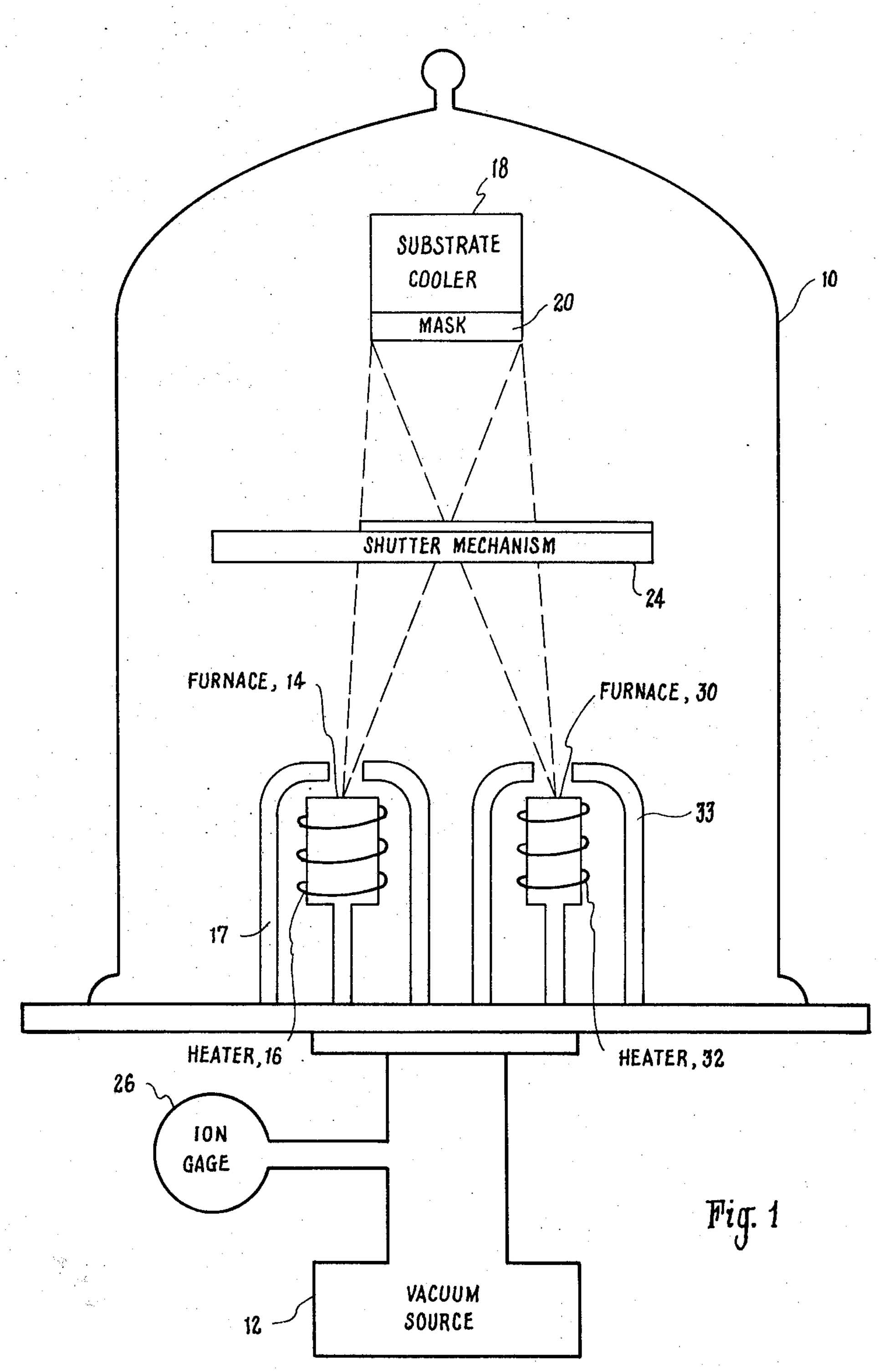
FIG. 1 is a schematic diagram of the evaporation apparatus in which the films and articles of this invention can be produced.

Referring now in greater detail to FIG. 1 of the drawing, the evaporation apparatus, in which the films and articles of this invention are produced, is shown as including a bell jar 10 connected to any standard vacuum source 12. Disposed within bell jar 10 is a first furnace 14, in which one portion of the material to be sublimed is placed and a heater coil 16, which may be made of nichrome or molybdenum, for heating the material. It should be noted that the material to be sublimed is preferably placed in a silica crucible, not shown, in furnace 14. Water cooling jacket 17 is positioned around furnace 14 in order to keep the temperature at or near room temperature at all points near the furnace except at the point where the material to be deposited is to be sublimed. The substrate is placed in a substrate cooler 18 which can be a liquid nitrogen cooled substrate holder. Mask 20 is interposed between the substrate and furnace 14. A movable shutter mechanism 24 is interposed between mask 20 and furnace 14. An ion gage 26 is provided to measure the total pressure in the apparatus. Additionally, thermocouples (not shown) can be used to monitor the temperature of the substrate cooler and all the furnaces. A furnace 30 is also disposed in the bell jar 10 to evaporate a second material which is to be deposited on the substrate. Furnace 30 also has a heating coil 32 around it which may be made of nichrome or molybdenum. Additionally water cooling jacket 33 surrounds furnace 30 and performs the same function as water cooling jacket 17. As with furnace 14, any material that is to be sublimed is preferably placed in a silica crucible, not shown, inside furnace 30.

Figure 2:
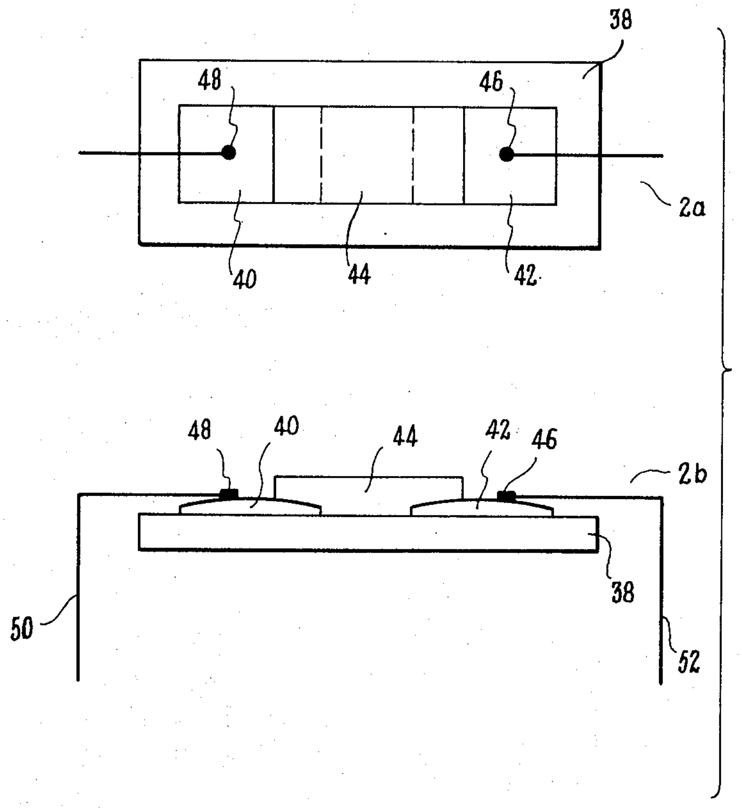
FIG. 2 is a diagram of a detector which can be prepared using the amorphous films of this invention with *2a* being a top view and *2b* being a side view.

FIG. 2 is a diagram of a typical detector which can be made with the amorphous films of this invention. The glass substrate 38 is covered by two sheets of a conducting material 40 and 42 which can be any electrical conductor but which preferably gold or aluminum. Note that there must be a space between the two sheets of the conducting material. These metal sheets are also preferably vacuum vapor deposited onto the glass substrate. Amorphous film 44 is then vapor deposited over a portion of each of the sheets of conducting material and over the space between these two sheets. Two drops of silver paint, 46 and 48 one on the exposed portion of each of the two sheets of electrical conducting material, are then added in order to provide for the lead wires 50 and 52 which go on to complete the circuit for the detector.

It is necessary to use a silica glass in contact with the amorphous film for these dectors because it has been found that the responsivity of the detector in the infrared region is due in part to the molecular resonance-vibration-absorption of the Si-0 bond of the glass. Thus glass in which the Si-0 resonance absorption is strongest will yield detectors with the optimum photosensitivity. Thus, within the meaning of this invention the term "glass" is meant to include any glass which contains Si-0 bonds.

It should be noted that the glass need not necessarily be the mechanical support for detector. The only requirement is that the amorphous film be in contact with the glass. Thus the glass may be in the form of a film, may be a mechanical support for the detector or may take on any other geometrical for provided that the amorphous film contact the glass.

Furthermore if additional elements are present in the detector they must be arranged in such a manner as not to cause an electrical or thermal short in the detector.

In the particular embodiment of the invention shown in FIG. 2 the glass is both the mechanical support for the detector as well as the substrate. In this arrangement one would prepare the detectors of this invention by evaporating an electrically conductive material onto the surface of the glass using the apparatus of FIG. 1. It is necessary to evaporate onto the glass at least two separate and distinct electrodes of electrical conducting material so that there is a gap between these two elements. The preferred materials are gold and aluminum. These elements are represented by 40 and 42 in FIG. 2*b*.

Once these are affixed to the glass substrate the amorphous film is then evaporated onto the substrate so that the film bridges the gap between the two electrical conducting elements and touches the glass substrate itself. It should be noted that the amorphous film will also be in contact with both of the electrical conducting electrodes. Vapor deposition of the amorphous film is conducted at or below room temperature. The amorphous films of this invention are those of the formula $[A_{1-y}\,(Pb_{1-x}\,Sn_x)_y]_z\,b_{1-z}$ wherein $A$ is Ge or Si and B is Te or Se and wherein $Y$ varies from 0 to 1, $x$ varies from 0 to 1 and $z$ varies from 0 to 1. The amorphous film of $[Ge_{1-y}\,(Pb_{1-x}\,Sn_x)_y]_{0.5}\,Te_{0.5}$ is however most preferred as are the values of 0.04 – 0.35 and 0.1–0.3 for $Y$ and $x$ respectively.

After the amorphous film has been evaporated onto the substrate one need only add one drop of conducting glue 46 and 48 on each of the exposed portions of the electrical conducting material in order to attach electrical leads to the detector. Those skilled in the art of course realize that many materials can be used in place of the conducting glue since the only function of the material is to secure the electrical leads to the electrical conducting electrodes of the detector. Naturally the material to be used to fasten the electrical lead should also be an electrical conductor.

EXAMPLES

The fabrication of the detector is as follows:

Two electrical conducting electrodes made of gold, separated by a 0.1mm wide channel, are evaporated onto a 1mm thick glass substrate. Next the amorphous compound film is evaporated spanning the channel between the electrical conducting elements. During depostion the substrate temperature is not higher than 300° K and the pressure in the vacuum system is about $10^{-7}$ torr. The desired compound $(GeTe)_{1-y}\,(Pb_{1-x}\,Sn_x\,Te)_y$ is synthesized during condensation from the vapor phase by mixing two independently controlled molecular beams of GeTe and $Pb_{1-x}\,Sn_x\,Te$. The desired composition $Y$ is achieved by adjusting the evaporation speeds. The maximum condensation speed per constituent is about 5 A/sec at a distance of about 10 cm from the source. Both $GeTe$ and $Pb_{1-x}\,Sn_xTe$ are evaporated from silica crucibles.

Typical devices which have been prepared are as follows: $[Ge_{1-Y}\,(Pb_{0.8}\,Sn_{0.2})_y]_{0.5}\,Te_{0.5}$

| y | Thickness (microns) | Substrate |
|---|---|---|
| 0.34 | 0.43 | Z-cut quartz |
| 0.14 | 0.4 | Corning No. 2950 glass |
| 0.27 | 0.62 | " |
| 0.32 | 0.80 | " |
| 0.085 | 1.67 | " |
| 0.06 | 2.20 | " |
| 0.04 | 2.22 | " |

All of these detectors proved to be able to detect in the infrared region of the electromagnetic spectru.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. An infrared detector element comprising
a silicon oxide based glass and
an amorphous film contacting said glass wherein said film comprises a material of the formula $[A_{1-y}(Pb_{1-x}Sn_x)_y]_zB_{1-z}$ wherein $A$ is selected from the group consisting of $Ge$ and $Si$, $B$ is selected from the group consisting of $Te$ and $Se$, $x$ varies from 0 to 1 and $y$ varies from 0 to 1 and $z$ varies from 0 to 1.

2. The infrared detector element of claim 1 wherein said glass is also the substrate.

3. The infrared detector element of claim 1 wherein $A$ is $Ge$ and $B$ is $Te$.

4. The infrared detector element of claim 2 wherein $A$ is $Ge$ and $B$ is $Te$.

5. The infrared detector element of claim 1 wherein $x$ varies from about 0.1 to about 0.3, $y$ varies from about 0.04 to about 0.35 and $z$ is about 0.5.

6. The infrared detector element of claim 2 wherein $x$ varies from about 0.1 to about 0.3, $y$ varies from about 0.04 to about 0.35 and $z$ is about 0.5.

7. The infrared detector element of claim 3 wherein $x$ varies from about 0.1 to about 0.3, $y$ varies from about 0.04 to about 0.35 and $z$ is about 0.5.

8. The infrared detector element of claim 1 which additionally comprises a pair of adjacent but non-contacting electrical conducting electrodes contacting one surface of said glass and contacting said amorphous film.

9. The infrared detector element of claim 2 which additionally comprises a pair of adjacent but non-contacting electrical conducting electrodes contacting one surface of said glass and contacting said amorphous film.

10. The infrared detector element of claim 3 which additionally comprises a pair of adjacent but non-contacting electrical conducting electrodes contacting one surface of said glass and contacting said amorphous film.

11. In the method of detecting infrared radiation using an infrared detector the improvement comprisng using the detector element of claim 1.

12. In the method of detecting infrared radiation using an infrared detector the improvement comprising using the detector element of claim 2.

13. In the method of detecting infrared radiation using an infrared detector the improvement comprising using the detector element of claim.

14. In the method of detecting infrared radiation using an infrared detector the improvement comprising using the detector element of claim 4.

15. In the method of detecting infrared radiation using an infrared detector the improvement comprising using the detector element of claim 8.

16. In the method of detecting infrared radiation using an infrared detector the improvement comrising using the detector element of claim 9.

17. In the method of detecting infrared radiation using an infrared detector the improvement comprising using the detector element of claim 10.

* * * * *